United States Patent [19]

Usher et al.

[11] 4,370,476

[45] Jan. 25, 1983

[54] DEXTRAN POLYCARBOXYLIC ACIDS, FERRIC HYDROXIDE COMPLEXES

[76] Inventors: Thomas C. Usher, P.O. Box N7525, Nassau, The Bahamas; Izu Hattori, 4 Box Hill Dr., West Hill, Ontario, Canada

[21] Appl. No.: 200,031

[22] Filed: Oct. 23, 1980

Related U.S. Application Data

[63] Continuation-in-part of Ser. No. 58,151, Jul. 17, 1979, abandoned, which is a continuation-in-part of Ser. No. 764,194, Jan. 31, 1977, abandoned.

[51] Int. Cl.$^3$ ............................................. C08B 37/02
[52] U.S. Cl. .................................. 536/113; 536/112; 424/180
[58] Field of Search ................. 536/112, 113; 424/180

[56] References Cited

U.S. PATENT DOCUMENTS 3,297,604  1/1967  Germino ............................ 536/114
3,535,308  10/1970 Schaefer et al. .................... 536/114
3,536,696  10/1970 Alsop et al. ......................... 536/112
3,553,193  1/1971  LeRoy et al. ....................... 536/120
3,928,581  12/1975 Dahlberg et al. ................... 536/112

FOREIGN PATENT DOCUMENTS 1200902 8/1970 United Kingdom ................ 536/113

OTHER PUBLICATIONS

Khomyakov et al., "Vysokomol Soyed", vol. 7, No. 6, 1965, pp. 1030–1040.

Primary Examiner—Johnnie R. Brown
Attorney, Agent, or Firm—I. Louis Wolk

[57]         ABSTRACT

The present invention relates to novel dextran derivatives having a plurality of carboxylic acid groups positioned upon intermediate glucose or glucopyranose units of the dextran polymer, and substances formed therefrom by complexing or chelation with colloidal ferric hydroxide to produce stable products of low intravenous toxicity and containing a relatively high iron content. It further relates to a process for producing said polycarboxylic acid compounds as well as the ferric hydroxide complexes described.

2 Claims, No Drawings

DEXTRAN POLYCARBOXYLIC ACIDS, FERRIC HYDROXIDE COMPLEXES

This application is a continuation-in-part of application Ser. No. 058,151, filed July 17, 1979, now abandoned, which in turn is a continuation-in-part of application Ser. No. 764,194 filed Jan. 31, 1977 now abandoned.

BACKGROUND OF THE INVENTION

Dextran $(C_6H_{10}O_5)_n$ is a polysaccharide polymer containing a plurality of mainly alpha-1,6 linked glucopyranose of glycosyl units obtained by the action of certain organisms upon sucrose by methods well known to the prior art. It is generally produced in the form of a polydispersed molecule of a mixture of polymers of various molecular weights.

Iron dextran has been developed and utilized as a satisfactory product for therapeutic use, primarily as an agent for correcting iron deficiencies in animals and humans by parenteral administration as by intravenous or intramuscular injection. This product has certain advantages deriving from low toxicity, low incidence of side reactions and effective rate of iron absorption. It is frequently prepared by forming a complex of dextran with colloidal ferric hydroxide.

Certain prior art patents describe ferric hydroxide complexes with dextran or other carbohydrate derivatives in efforts to achieve a desired high iron content and suitable stability and low toxicity. Illustrative of such art are U.S. Pat. No. 3,536,696 to Alsop and Bremner and British Pat. No. 1,200,902 to the same inventors. Their U.S. patent describes the formation of ferric hydroxide complexes with a dextran monocarboxylic acid formed by introducing a carboxylic acid group into a terminal unit of the dextran polymer to form a dextran heptonic acid. The Alsop et al. British patent relates to a procedure for forming the ferric hydroxide complex by controlling the rate of addition of alkali during complexing. No reference is made to the use of any type of dextran polycarboxylic acid.

A patent to Dahlberg et al., U.S. Pat. No. 3,928,581, states that the use of low molecular weight dextrans and dextrans in the formation of iron complexes is undesirable due to toxic and other side effects and proposes instead to utilize certain more complex polymers formed from a saccharide such as sucrose, a polymerization agent such as an epoxide, and a hexitol such as sorbitol, and then reacting with cyanide followed by acidification and hydrolysis to form an end product having a carboxylic acid group attached thereto.

Certain other prior art patents describe oxidation with various types of carbohydrate polymers to form products useful in industry, such as tanning agents and textile or paper treating materials.

One disadvantage of conventional iron dextran complexes is the fact that it is difficult to obtain stable complexes in colloidal solution with fairly high iron content; say more than 10%, and that as the iron content increases, viscosity of the complex increases rapidly so that at higher iron content the higher viscosity impedes administration by injection and decreases the rate of absorption into animal tissues.

SUMMARY OF THE INVENTION

We have now discovered that certain novel polycarboxylic acid derivatives of dextran can be synthesized which contain a plurality of internal carboxylic acid groups positioned on one or more intermediate glucopyranose units of the dextran polymer, and that these derivatives will form stable colloidal complexes with ferric hydroxide with comparatively high iron content, and that the resulting complexes will have a low order of toxicity and permit a high degree of absorption of iron, while at the same time providing complexes of lower viscosity for a given iron content than products of the prior art.

The novel polycarboxylic acid derivatives of this invention have been found to be produced with a pair of carboxylic acid groups formed upon one or more intermediate glycosyl units as a result of oxidation or cyanidation followed by hydrolysis of corresponding aldehyde groups which in turn have been formed in a preliminary oxidation reaction.

We have also discovered that in order for the dextran derivatives to produce suitable injectable products it is necessary for them to have a low intrinsic viscosity, preferably in the range of 0.028–0.085, and that the mean molecular weight of the dextrans in the mixed polymers must be fairly low, i.e. 9000 or less. On the other hand, if the mean molecular weight of the dextrans in the polymer mixture is extremely low, i.e. below 1000, the product will be two toxic. In referring to mean molecular weight, it should be noted that dextrans, as produced commercially, occur in a broad range of molecular weights in admixture and can be fractionated to produce a particular range of molecular weights or to obtain a product having a desired molecular weight composition. In accordance with the present invention, the preferred range of mean molecular weights of the mixed dextran polymer is from 1200 to 6000, since if the molecular weight is too high the product forms a gel and if it is too low the product is unstable and may be too toxic.

Where the molecular weight is referred to herein, applicants intend for this to indicate the mean molecular weight of a mixture of dextrans.

DETAILED DESCRIPTION OF THE INVENTION

The polycarboxylic acids of our invention are prepared by first introducing into the dextran molecule by a mild oxidation, a plurality of aldehyde groups in addition to the aldehyde groups already present on the terminal glucose unit, followed by direct further oxidation of the aldehydes, to form the carboxylic acid groups by use of stronger oxidizing agents, such as, bromine, sodium chlorite, etc., or by cyanidation following the preliminary oxidation to aldehydes to produce the cyanohydrin, followed by hydrolysis to produce corresponding acids.

The aldehyde groups may be introduced by oxidizing dextran or hydrogenated dextran using sodium or potassium periodate as the oxidizing agent since the periodate will oxidize to form aldehyde groups without further oxidation to acids. As a result of the oxidation, two aldehyde groups may be formed upon each glucose unit oxidized although the total number units oxidized and aldehyde groups obtained will depend upon the severity of the oxidation reaction and the molecular weight of the dextran polymer.

The dextran polyaldehyde product thus obtained may be oxidized further utilizing a suitable oxidizing agent such as bromine to produce the corresponding carboxylic acid groups. Alternatively, the aldehydes may be reacted with cyanide to produce the cyanohydrin and hydrolyzed to produce corresponding acids, as referred to above.

Other suitable oxidizing agents for the second oxidizing stage to produce the carboxylic acid groups, in addition to bromine are sodium hyprobromite, sodium bromite or chlorine, sodium hypochlorite and sodium chlorite. We may also use iodine. Hydrogenated dextrans may be produced by the procedures described in U.S. Pat. No. 3,234,209.

In the case of oxidation of hydrogenated dextrans the aldehyde groups and corresponding polycarboxylic acids will be positioned only upon intermediate units since the terminal aldehyde will have been hydrogenated to form the alcohol, so that the end product will have one less carboxylic acid group than the same unhydrogenated dextran.

The acid products are treated to remove inorganic ions by passage through mixed bed iron exchange resins or by dialysis or electrodialysis.

The iron complex may be formed by reacting the polycarboxylic acid with purified ferric hydroxide in colloidal solution or suspension preferably at an initial pH of 6.0–8.7 at a raised temperature in an autoclave. In this procedure the iron may be said to complex with the dextran derivative by the process of chelation.

As described below the iron complex can be obtained in the form of a colloidal suspension in water with an elemental iron content of about 5–28% w/v in which the water content of the colloidal complex may vary but is generally in the range of 56–87% w/v. Such higher iron concentrations are obtained by concentration with evaporation and the resulting suspensions have been found to be stable even with high iron concentrations. This permits the use of lesser proportions of dextran and lower non-volatile residues for the same amount of iron. The finished product has an extremely low free iron content with less than 0.05% of free ferric and ferrous iron and can easily tolerate usual autoclaving conditions such as 121° C. for 30 minutes for sterilization. If desired, the colloidal complex solution of suspension can be dried to powder and used as such or reconstituted in solution, but where it is to be ampouled or vialled for injection purposes it is preferable to recover the complex in water suspension for use in this form. The product also shows uniform dispersion and good tissue absorption at the injection site when tested on the legs of rabbits. Toxicity is low and the complex is found to be suitable for parenteral human and animal injection through intravenous tests on mice.

The reactions referred to may be illustrated as follows:

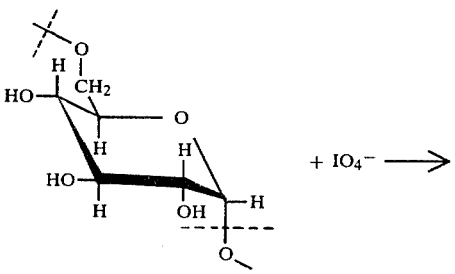

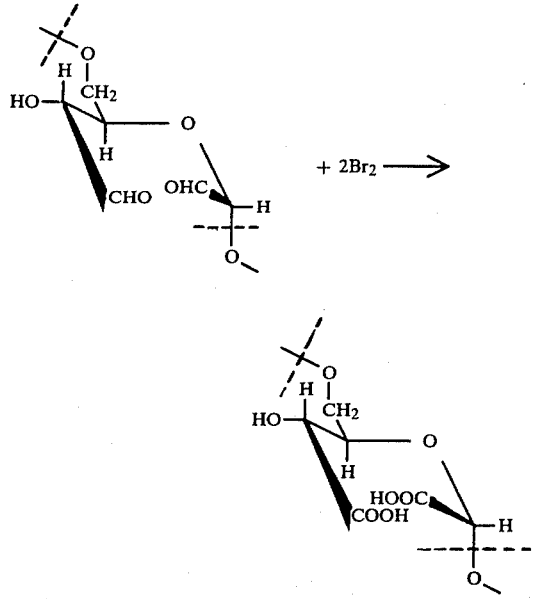

The above illustrates the use of the bromine oxidation insofar as it affects those of the intermediate dextran units which are oxidized to form aldehyde groups. This applies whether the dextran utilized as a starting material is hydrogenated or not.

As an alternative to the bromine oxidation, the aldehyde groups introduced into the intermediate glucopyranose units can be treated further to produce the corresponding polycarboxylic acids by using cyanide, such as, potassium cyanide, sodium cyanide or hydrogen cyanide. In some cases the reaction can be illustrated as follows:

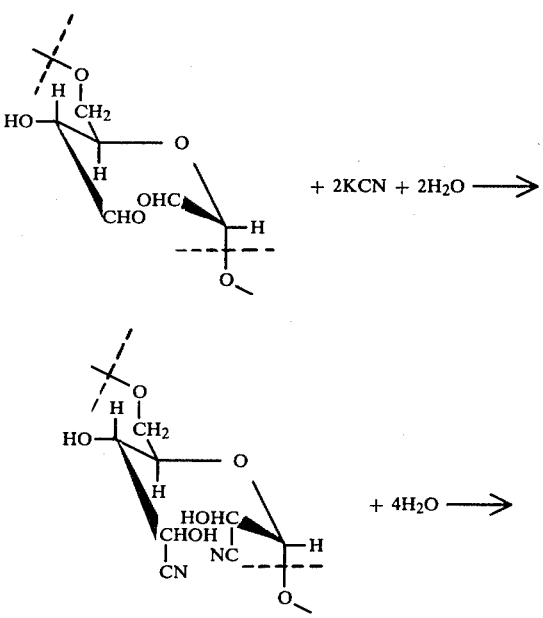

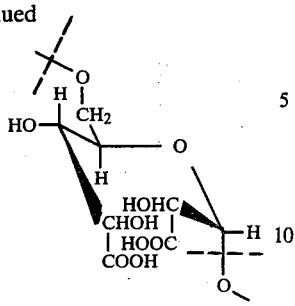

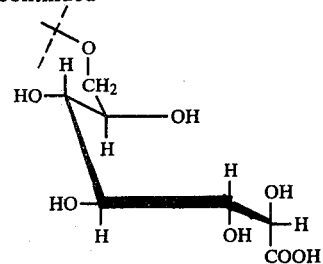

It will be seen that as the result of the bromine oxidation each unit which is oxidized to aldehyde and carboxylated contains six carbon atoms, while in the case of cyanohydrin reaction to the aldehyde groups to produce the carboxylic acid groups, each unit contains eight carbon atoms.

In case the unhydrogenated dextran is used as a starting material, the terminal aldehyde group will react as follows using the cyanohydrin reaction.

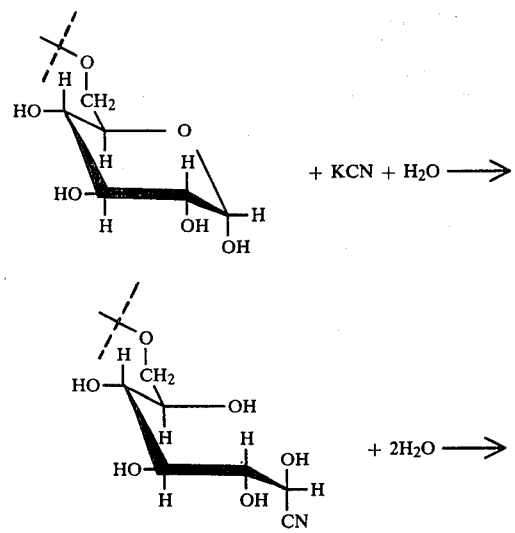

In the case of the hydrogenated dextran, the terminal aldehyde group is hydrogenated and does not get oxidized to form a terminal carboxylic acid group.

The total number of aldehyde groups produced in each dextran molecule will depend on the degree of oxidation, or upon the nature and concentration of the oxidizing agent used and the molecular weight of dextran. In general it is preferred to carry out the reaction under such conditions that from 2 to 10 intermediate aldehyde groups are formed in each dextran polymer which means that aldehyde groups are formed in from 1 to 5 internal glucose units of the polymer with the result that the final polycarboxylic acid will be a dextran derivative containing from 2 to 10 carboxylic acid groups positioned in pairs on internal units of the polymer. In the case of unhydrogenated dextran as the starting material, the terminal aldehyde when oxidized and/or reacted with cyanide will result in an additional carboxylic acid group, in which case the dextran derivative would preferably have from 3 to 11 carboxylic acid groups. In view of the ease of oxidation of the aldehyde groups as long as excess oxidant is used, all of the aldehyde groups are oxidized to polycarboxylic acids.

The number of intermediate aldehyde groups formed is determined by standard reducing sugar tests and the number of carboxylic acid groups present in the polycarboxylic acid groups present in the polycarboxylic acid can be determined by titration.

To illustrate further, the structures of the intermediate and final products obtained by the two stage oxidation or oxidation-cyanidation processes referred to, the typical structures obtained at each stage are shown below.

A. Structure of a representative dextran polymer, unhydrogenated.

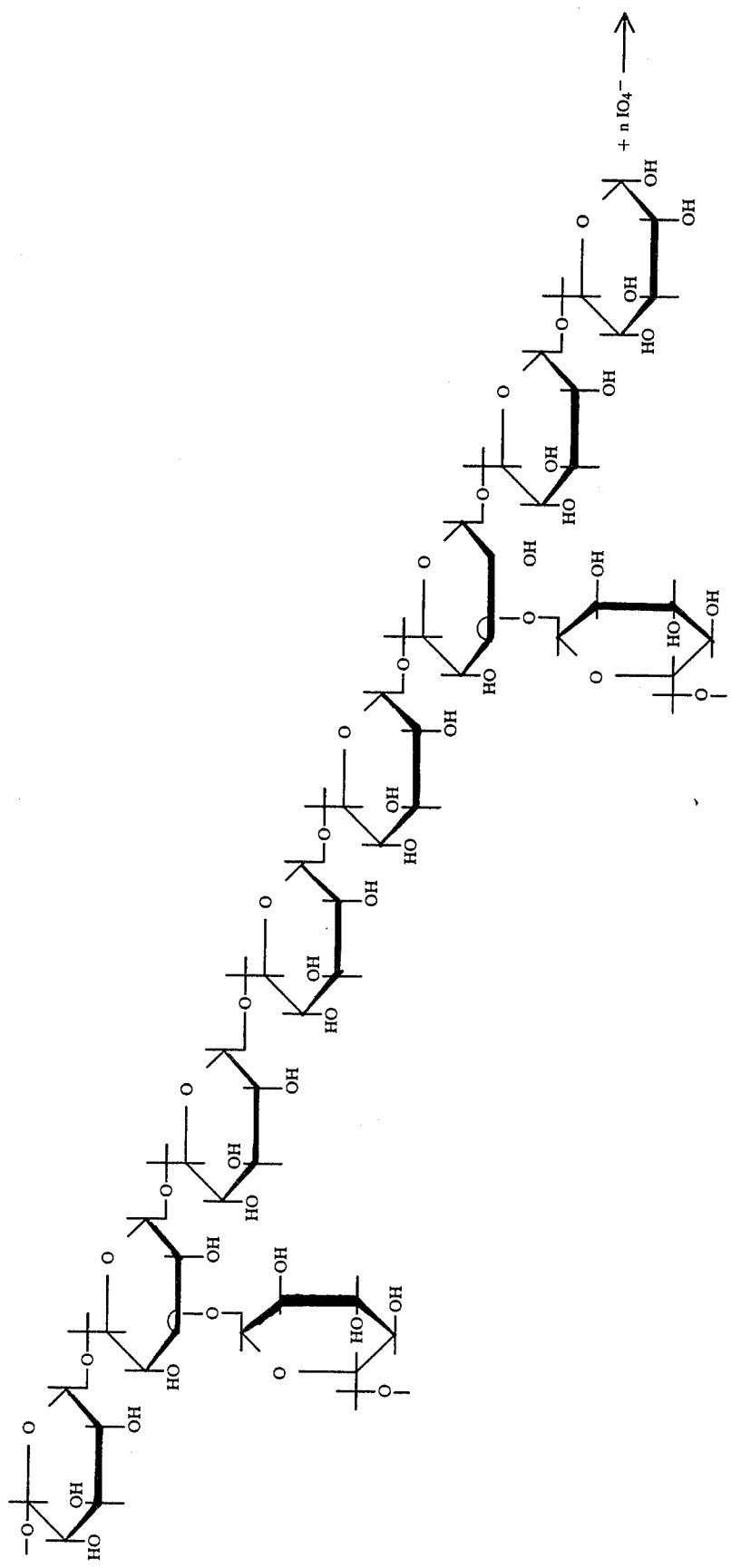

B. Structure of A, following preliminary oxidation to form aldehydes.

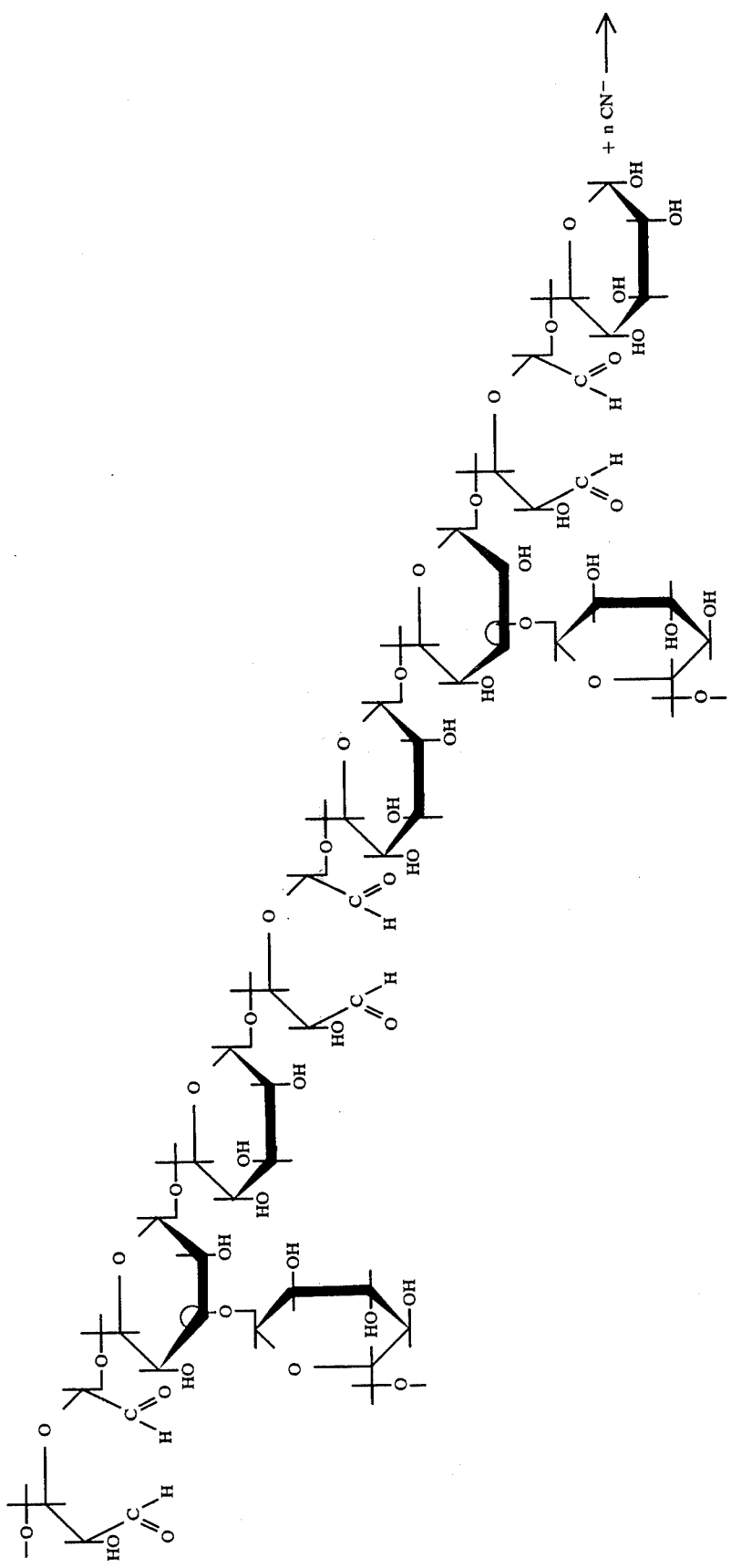

C. Structure of B after cyanidation preparatory to hydrolysis.

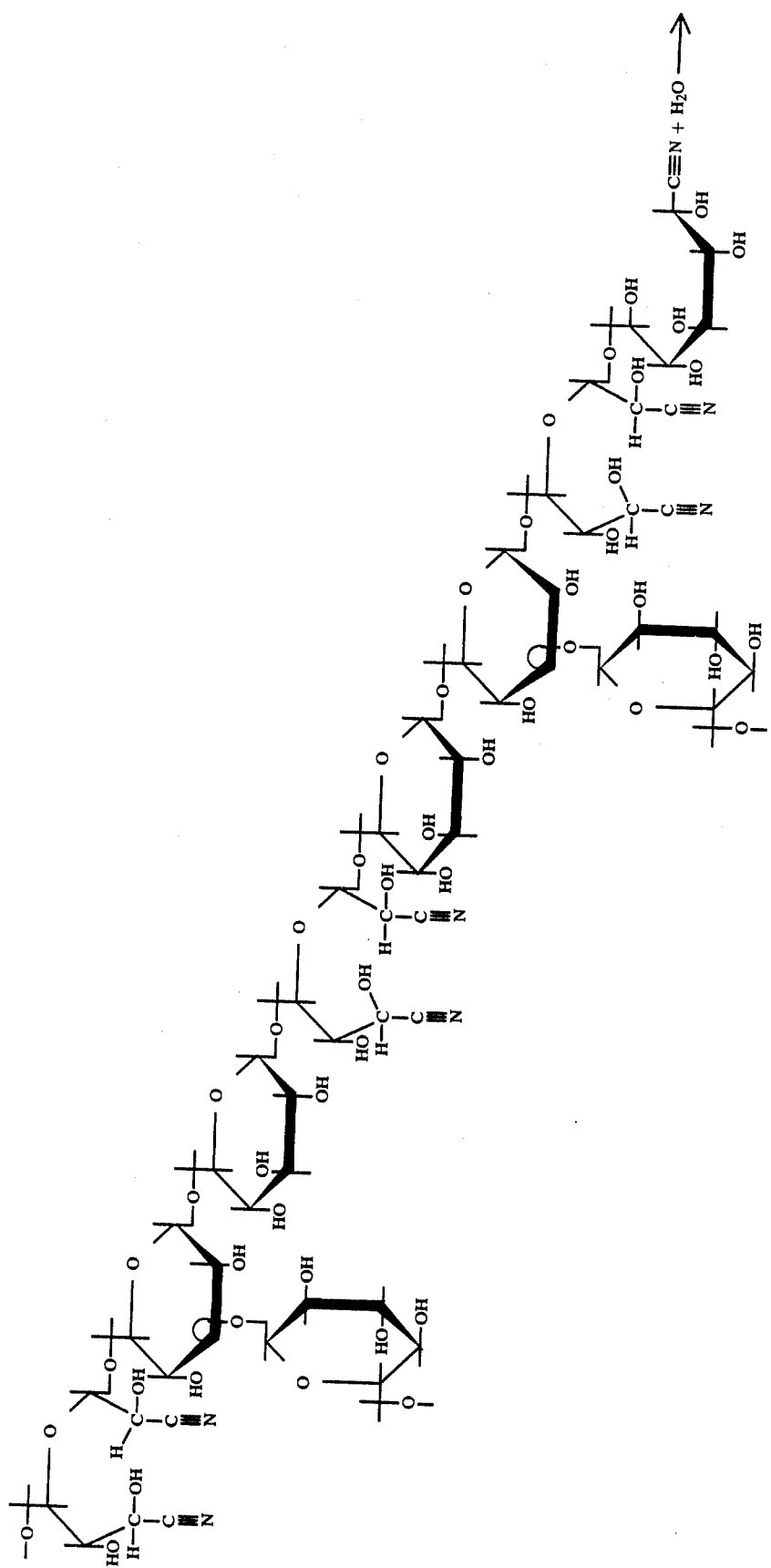

D. Final product, after hydrolysis of C, to produce three pairs of carboxylic acid groups upon three intermediate glycosyl units, plus a terminal carboxylic acid group.

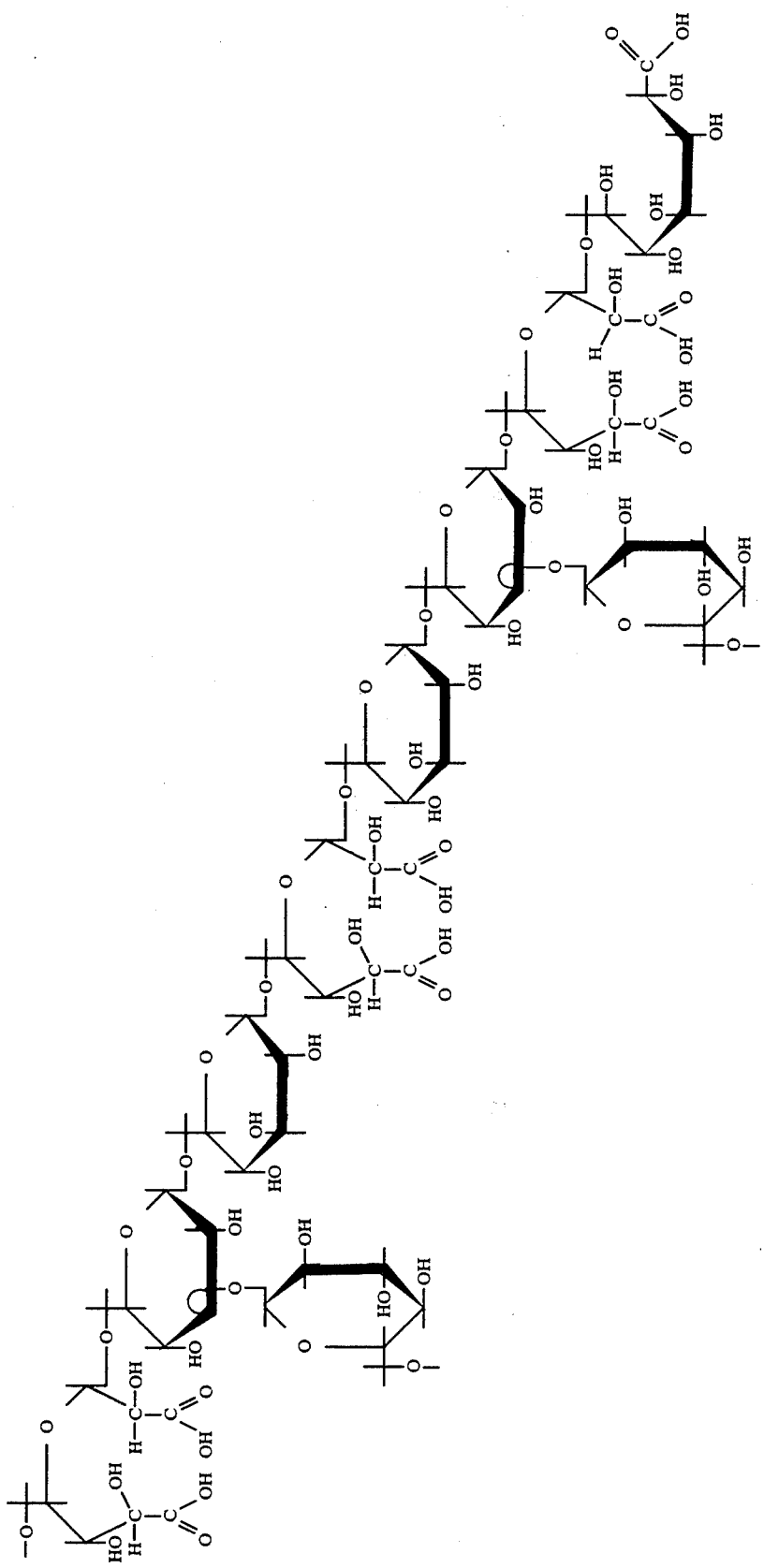

E. Final product in modified process in which the product of B is oxidized further in a second stage oxidation.

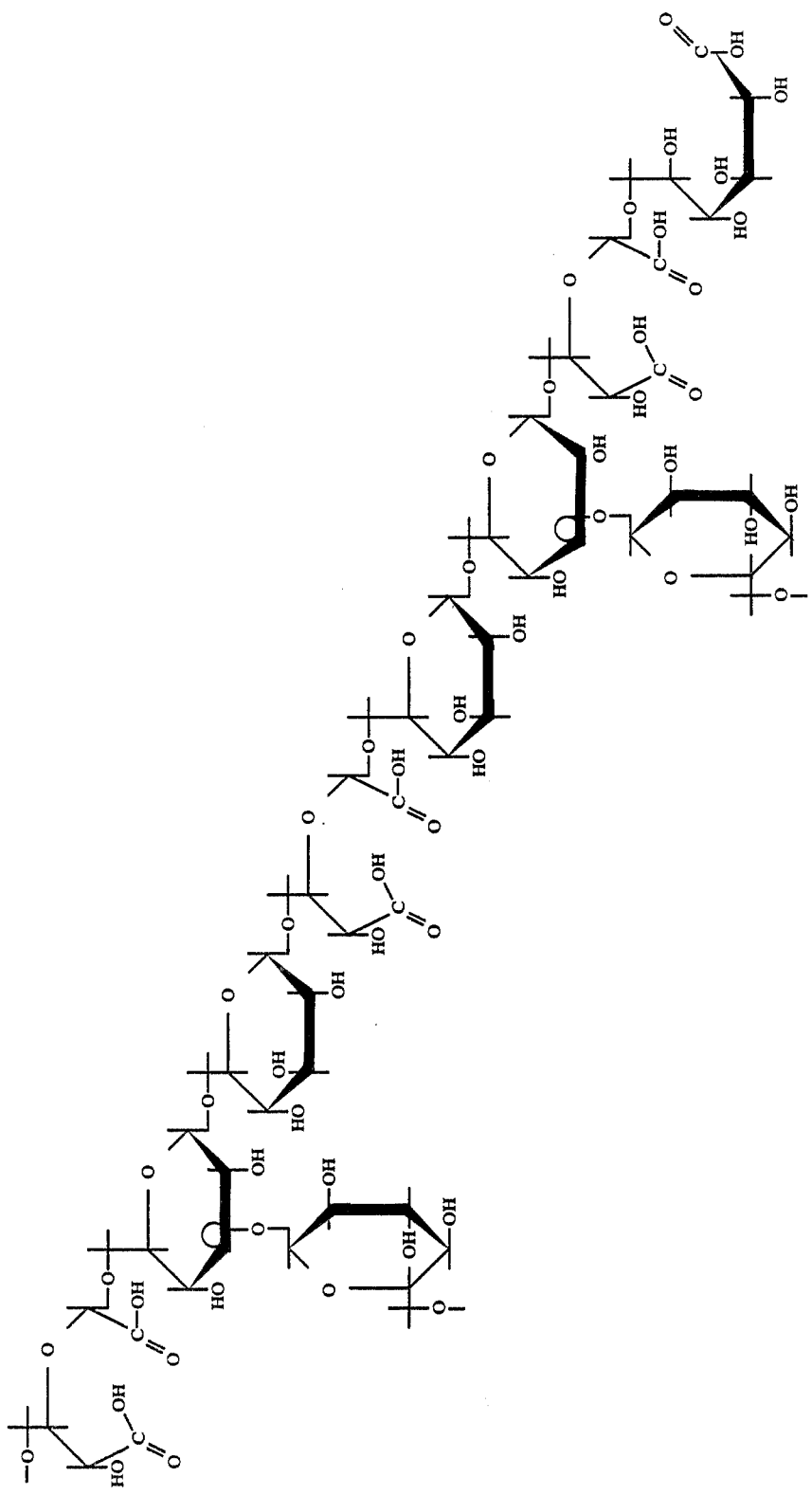

The following examples illustrate the manner in which the invention is carried out.

EXAMPLE 1

Take 2312 liters of low molecular weight dextran (M.W. 3,400) solution having 17.3% concentration measured by polarimeter, intrinsic viscosity of 0.052 and pH of 5.5. 57 kg of potassium periodate is added into this low molecular weight dextran solution and the pH is maintained at 4.5 by adding 10% NaOH under agitation for 2 hours. Then this solution is deionized through a mixed bed ion exchange resin followed by 800 liters of water and added to the solution. This deionized solution has a volume of 3080 liters, a concentration of 12.0% as measured by polarimeter, conductivity of 40 micromhos, calculated dextran content of 369.6 kg, pH of 3.8. It is determined that 4 aldehyde groups are produced on two intermediate glycosyl units. Take 180 kg of bromine and add slowly into the dextran solution. The pH is maintained between 3 and 7 by adding 25% NaOH simultaneously into the solution while the reaction temperature is kept below 20° C. When all the bromine is added, which is 6 hours after starting, the solution is deionized through a mixed bed ion exchange resin. The produced purified dextran polycarboxylic acid solution has a concentration of 7.8% as measured by polarimeter, volume of 4190 liters, calculated dextran content of 326 kg, pH of 2.2 and conductivity of 760 micromhos. The product contained 4 carboxylic acid groups positioned in two pairs on two internal units of the polymer plus one carboxylic acid group on the terminal unit.

Take 3080 liters of above solution containing 240 kg of dextran and adjust the pH to 5.0 with 10% NaOH. 2470 liters of purified ferric hydroxide solution with its elementary iron content of 8.09%, containing 200 kg of iron with pH of 3.5, conductivity of 2100 micromhos, chloride content of 0.9% is mixed with the solution. The pH of the mixture is adjusted from 3.08 to 8.7 with 10% NaOH and placed in an autoclave at 121° C. for one hour with agitation. After autoclaving, the solution is concentrated to 2000 liters by boiling and then precipitated with equal amount of isopropyl alcohol. The supernatant is decanted and the precipitate is redissolved with 1500 liters of distilled water to give a total volume of 2500 liters and again reconcentrated to the volume of 1800 liters. Thus produced complex has an elementary iron content of 10.0%, chloride content of 0.3% and pH of 6.4. The chloride content is adjusted to 0.95% by adding NaCl and phenol is added to give 0.5% concentration and then it is filtered through a sterile filter pad followed by filtration through 0.45 micron membrane filter. Then the complex is vialled and autoclaved at 121° C. for 30 minutes.

By injecting 10 mice each weighing 18 to 20 g with the complex at a dose equivalent to 2000 mg Fe/kg intravenously no deaths were observed within 5 days after injection. After 7 days following injection into the legs of rabbits, the complex shows uniform dispersion and good tissue absorption at the injection site. Rate of absorption is 91.2%. Toxicity is low and the complex is found to be suitable for parenteral human and animal injection through above tests on mice and rabbits.

EXAMPLE 2

57 liters dextran polycarboxylic acid solution as prepared in Example 1 is taken and its pH is adjusted to 6.0. 71 liters of purified ferric hydroxide, with an elementary iron content of 7.8%, pH of 3.4, conductivity of 2000 micromhos, chloride content of 0.7%, is mixed therewith. The pH is adjusted to 6.5 with 10% NaOH and heated to 80° C. for 2 hours while the pH is, from time to time, adjusted to 6.5. Then the solution is put into an autoclave at 121° C. for 2 hours with agitation. After autoclaving, the complex is concentrated by gentle boiling until elementary iron content reaches to 18%. Then it is precipitated with an equal amount of isopropyl alcohol and the precipitate is redissolved to give an elementary iron content of 12% and reconcentrated with gentle boiling until the elementary iron content reaches to 21%. Thus obtained complex has a pH of 6.0, chloride content of 0.4% with a non-volatile residue content of 55%. The chloride content is adjusted to 0.9% by adding sodium chloride. This complex is then filtered through a sterile filter pad followed by filtration through a 0.45 micron membrane filter. The total free iron content is 0.04%.

By injecting 10 mice each weighing 18 to 22 g with the complex at a dose equivalent to 2,000 mg Fe/kg intravenously no deaths were observed within 5 days after injection. After 7 days following injection into the legs of rabbits, the complex shows uniform dispersion and good tissue absorption at the injection site. Rate of absorption is 94.6%. Toxicity is low and the complex is found to be suitable for parenteral human and animal injection through above tests on mice and rabbits.

EXAMPLE 3

100 g of low molecular weight dextran (molecular weight 6,000) having its intrinsic viscosity of 0.070 is dissolved into 700 ml of distilled water. 20 g of potassium periodate is added while the pH is maintained with 10% sodium hydroxide at 4.5 for 2 hours. Then the solution is deionized through a mixed bed ion exchange resin. This solution has a pH of 3.4, conductivity of 45 micromhos, concentration of 7.6% as measured by polarimeter, volume of 920 ml and calculated dextran content of 70 g. It is determined that 10 aldehyde groups were produced on 5 intermediate glycosyl units. 42 g of bromine is added into this solution and 25% NaOH is slowly added while its pH is maintained lower than 7 under fast agitation in an ice bath to maintain the temperature below 20° C. When all the bromine disappears, the solution is deionized through a mixed bed ion exchange resin. Volume of this purified dextran polycarboxylic acid solution is 1260 ml at concentration of 4.3% as measured by polarimeter, calculated amount of dextran is 54 g, pH of 2.4 and conductivity of 470 micromhos. The product contained 10 carboxylic acid groups positioned in 5 pairs on 5 internal units of the polymer plus one carboxylic acid group on one terminal unit. The pH of this solution is adjusted to 6.0 with 10% NaOH. 205 ml of purified ferric hydroxide, having its elementary iron concentration of 8.8%, containing 18 g of iron, pH of 3.2, conductivity of 2150 micromhos and chloride content of 0.7%, is added and the pH of the mixture is adjusted to 8.5 with 10% NaOH. The solution is autoclaved at 121° C. for 30 minutes under agitation then concentrated to 300 ml and precipitated with isopropyl alcohol. The precipitate is redissolved to give 440 ml volume and concentrated again under gentle boiling to 320 ml. The complex has a pH of 6.1, chloride content of 0.25 and elementary iron content of 5.0%. The chloride content is adjusted to 0.5% by adding sodium chloride and the complex is filtered through a sterile grade filter pad followed by 0.45 micron membrane filter. Then the product is vialled and autoclaved at 121° C. for 30 minutes.

By injecting 10 mice each weighing 18 to 22 g with the complex at a dose equivalent to 2000 mg Fe/kg intravenously no deaths were observed within 5 days after injection. After 7 days following injection into the legs of rabbits, the complex shows uniform dispersion and good tissue absorption at the injection site. Rate of absorption is 85.4%. Toxicity is low and the complex is found to be suitable for parenteral human and animal injection through above tests on mice and rabbits.

EXAMPLE 4

200 g of low molecular weight hydrogenated dextran (M.W. 1,200) having its intrinsic viscosity of 0.031 is dissolved into distilled water to 1400 ml. 40 g of potassium periodate is added and the pH is maintained at 4.5 with 10% NaOH as the pH drops during the reaction process. Oxidation is allowed to take place for 2 hours at 25° C. to produce polyaldehyde dextran. It was determined that two aldehyde groups were produced on one intermediate glycosyl unit.

To the above mixture 10% NaOH is added to adjust the pH to 7.0 then 60 g of potassium cyanide is added. The mixture is warmed to 40° C. and maintained for 12 hours. The temperature is then raised to 95° C. while blowing air through the mixture for 30 minutes to expel $NH_3$ gas. The mixture is cooled to room temperature and deionized through a mixed bed ion exchange resin. 1900 ml solution is recovered together with eluting water having its conductivity of 1200 micromhos. The pH is 2.8 with dextran concentration of 6.9% measured by polarimeter. The product contained two carboxylic acid groups positioned on an internal unit of the polymer plus one carboxylic acid group on one terminal unit.

To 1600 ml of above solution after adjusting the pH to 5.5 with 10% NaOH, 1620 ml of purified ferric hydroxide colloidal solution having elementary iron content of 8.5%, pH of 3.6, conductivity of 1400 micromhos, and chloride content of 0.5% determined by potentiometry, is added and the pH is adjusted with 10% NaOH to 6.2. The solution is then heated to 90° C. for 1 hour while pH is maintained at 6.2 by adding 10% NaOH, then put into an autoclave with agitation at 121° C. for 2 hours. After autoclaving, it is heated to gentle boiling until the volume is reduced to 800 ml. Then precipitate with equal volume of isopropyl alcohol, discard the supernatant and redissolve the precipitate in distilled water to give 1200 ml volume. Heat to gentle boiling until elementary iron concentration of 21.0% is obtained. Yield is 660 ml. The colloidal complex solution is found to have a chloride content of 0.6% and a pH of 6.0, with a total free iron content of 0.05% and non-volatile content of 53%. Adjust chloride content to 0.9% by adding sodium chloride and 3.3 g of phenol is added and then the complex is filtered through a sterile membrane filter pad followed by a 0.45 micron membrane filter. Then the complex is vialled and autoclaved at 121° C. for 30 minutes.

By injecting 10 mice each weighing 18 to 22 g with the complex at a dose equivalent to 2000 mg Fe/kg intravenously, 1 mouse died within 5 days after injection for unknown reasons. After 7 days following injection into the legs of rabbits, the complex shows uniform dispersion and good tissue absorption at the injection site. Rate of absorption is 92.0%. Toxicity is low and the complex is found to be suitable for parenteral human and animal injection through above tests on mice and rabbits.

EXAMPLE 5

200 g low molecular weight dextran (M.W. 4,500) having intrinsic viscosity of 0.06 is dissolved into distilled water to 1200 ml. 22 g of potassium periodate is added into the solution. The pH is maintained at 4.5 with 10% NaOH at 25° C. Oxidation takes place for 2 hours to produce polyaldehyde dextran. It was determined that four internal aldehyde groups were produced.

To the above mixture 10% NaOH is added to raise the pH to 7.0 then 30 g of potassium cyanide is added. The mixture is warmed to 40° C. and maintained for 15 hours. The temperature is raised to 95° C. while blowing air into mixture for 30 minutes to remove $NH_3$ gas. The mixture is then cooled to room temperature and deionized by passage through a mixed bed ion exchange resin. 1400 ml solution of concentration of 10.0% as measured by polarimeter is yielded after deionization together with eluting water. Conductivity is 900 micromhos and pH is 2.7. The dextran polycarboxylic acid is found to have four internal carboxylic acid groups in two pairs on two units and one terminal carboxylic acid group.

To 1000 ml of above solution, with pH adjusted to 6.0 with 10% NaOH, 1000 ml of purified ferric hydroxide colloidal solution containing 8.33% elementary iron with 0.75% chloride ion and having a conductivity of 2400 micromhos, and a pH of 3.4 is added. The mixture is adjusted to pH 8.5 and heated to evaporate until its iron content is 10.5% by gentle boiling. Then it is precipitated with an equal amount of isopropyl alcohol and the precipitate is redissolved to give an elementary iron content of 8% and reconcentrated with gentle boiling until the elementary iron content reaches to 10.5%. The yield is 745 ml of complex solution having chloride content of 1.02%, pH of 6.2 and non-volatile content of 33%. It is then filtered through a sterile filter pad followed by a 0.45 micron membrane filter. The complex is then vialled and autoclaved at 121° C. for 30 minutes.

By injecting 10 mice each weighing 18 to 22 g with the complex at a dose equivalent to 2000 mg Fe/kg intravenously no deaths were observed within 5 days after injection. After 7 days following injection into the legs of rabbits, the complex shows uniform dispersion and good tissue absorption at the injection site. Rate of absorption is 84.0%. Toxicity is low and the complex is found to be suitable for parenteral human and animal injection through above tests on mice and rabbits.

EXAMPLE 6

400 g of low molecule weight hydrogenated dextran (M.W. 5,700) having its intrinsic viscosity of 0.068 is dissolved into distilled water to 2000 ml. 50 g of potassium periodate is added into the solution. The pH is maintained at 4.5 with 10% NaOH at 25° C. Oxidation is allowed to take place for 2 hours to produce polyaldehyde dextran. It is determined that six intermediate aldehyde groups are produced.

To above mixture 10% NaOH is added to raise the pH to 7.0 then 55 g of potassium cyanide is added. The mixture is warmed to 40° C. and maintained for 15 hours. The temperature is raised to 95° C. while blowing air into the mixture for 30 minutes to remove $NH_3$ gas. The solution is cooled to room temperature and deionized through a mixed bed ion exchange resin. 2200 ml of solution is obtained after deionization together with eluting water having conductivity of 940 micromhos at 11.5% dextran concentration as measured by polarimeter. The pH is 2.9. The dextran polycarboxylic acid produced is determined to have six carboxylic acid groups positioned in pairs on 3 internal glucopyranose units.

To 2000 ml of above solution with pH adjusted to 6.0 with 10% NaOH, 870 ml of purified ferric hydroxide colloidal solution containing 8.25% elementary iron, 0.8% chloride is added. The resulting solution has a conductivity of 2700 micromhos and pH of 3.4. The mixture is adjusted to pH 8.5 and placed in an autoclave at 121° C. for 30 minutes with agitation and then heated to gentle boil to evaporate until the iron content of the complex is 6.0%. Then the solution is precipitated with equal amount of isopropyl alcohol and precipitate is redissolved into 1300 ml of distilled water and reconcentrated by gentle boiling to evaporate until the iron content of the complex is 5.2%. The yield is 1370 ml with chloride content of 0.54% and pH of 6.1 with a non-volatile content of 30%. The product is then filtered through a sterile filter pad followed by a 0.45 micron membrane filter. Then the complex is vialled and autoclaved at 121° C. for 30 minutes.

By injecting 10 mice each weighing 18 to 22 g with the complex at a dose equivalent to 2000 mg Fe/kg intravenously no deaths were observed within 5 days after injection. After 7 days following injection into the legs of rabbits, the complex shows uniform dispersion and good tissue absorption at the injection site. Rate of absorption is 84%. Toxicity is low and the complex is found to be suitable for parenteral human and animal injection through above tests on mice and rabbits.

Instead of complexing with ferric hydroxide as described in the foregoing examples, a ferric iron salt such as ferric chloride in solution may be utilized in place thereof, as illustrated in the following example, thereby forming ferric hydroxide for the complex in situ.

EXAMPLE 7

A solution of ferric chloride, having its Fe content of approximately 10% (w/v), is added into a plastic tank. A selected purified low molecular weight dextran polycarboxylic acid polymer solution, having its dextran content of approximately 16%, is mixed in a Fe:dextran ratio of 1.0:0.8 in the same tank.

The pH of the mixture is raised to about 6.0 with 24% (w/v) $Na_2CO_3$ solution and heated slightly at a temperature of 90°–100° F. to form the complex.

The iron dextran complex is precipitated by the addition of isopropyl alcohol. The precipitate is redissolved in deionized pyrogren free water to make a solution of 12–16% iron content. The pH is corrected to 6.0 to 6.5 by 10% NaOH, if necessary. The solution is autoclaved at 10 psi (117° C.) for 1 hour and reprecipitated by the addition of isopropyl alcohol and redissolved in deionized pyrogen free water.

Then the isopropyl alcohol and excess water is evaporated until the desired Fe content is reached, generally to 10–25%. The pH is made to 5.2 to 6.5 by adding 10% (w/v) NaOH or 10% w/v %HCl. Also, the chloride content is adjusted to between 0.8 w/v% and 1.1 w/v% with sodium chloride. Phenol is adjusted to between 0.45 w/v% and 0.55 w/v% with the addition of phenol. The solution is then filtered through a 0.45 micron membrane filter. After completion of Quality Control, the thus produced Iron Dextran is filled, either in plastic containers for bulk shipment or in vials and autoclaved for sterilization.

It was determined that the ferric complexes obtained in accordance with this invention resulted in a striking and useful improvement in viscosity for a given iron content over similar preparations of the prior art. In one comparative test carried out against a product known as "Gleptosil" which is understood to be produced in accordance with U.S. Pat. No. 3,536,696 the following results were obtained using a Brookfield Viscometer, Model LVF.

|  | Fe Content | Viscosity (CPS) at 25° C. |
| --- | --- | --- |
| Usher et al Iron Dextran | 20% | 18 |
| Gleptosil | 20% | 42.5 |
| Usher et al Iron Dextran | 25% | 72 |
| Gleptosil | 25% | 105 |

In carrying out the above test, both products were tested initially at 20% iron content, and then concentrated to 25% iron by heating and evaporation. Further evaporation of the Usher et al product to 28% iron was carried out to obtain a fluid product but it was not possible to evaporate the commercial product to that concentration by heating and evaporation in the absence of a vacuum while still retaining sufficient fluidity for viscosity comparisons.

The greatly reduced viscosity of applicants' product permits more rapid absorption into animal tissue and at the same time permits the use of conventional injecting equipment to inject higher iron content products.

While we do not wish to be bound by any theory as the reason for our ability to obtain an improved iron dextran with a high stable iron content, it is believed that the presence of a plurality of carboxylic acid groups positioned upon intermediate units of the dextran polymer molecule provide complexing sites for the ferric hydroxide which permit the association of greater amounts of the ferric hydroxide in a manner which binds the ferric hydroxide molecules to a higher degree than in complexes of the prior art.

We claim:

1. A complex of ferric hydroxide with a dextran carboxylic acid derivative having a mean molecular weight range between about 1000 and 9000 and an intrinsic viscosity of between 0.028–0.085, and in which a plurality of pairs of carboxylic acid groups are distributed upon intermediate glycosyl units of the dextran polymer.

2. A complex according to claim 1 wherein 2 to 10 carboxylic acid groups are positioned in pairs upon 1 to 5 glycosyl units of the polymer.

* * * * *